(12) United States Patent
Nonaka et al.

(10) Patent No.: US 7,724,978 B2
(45) Date of Patent: May 25, 2010

(54) IMAGE PROCESSING APPARATUS, IMAGE PROCESSING METHOD AND IMAGE PROCESSING PROGRAM

(75) Inventors: Shunichiro Nonaka, Asaka (JP); Yuko Matsui, Asaka (JP)

(73) Assignee: Fujifilm Corporation, Tokyo (JP)

( * ) Notice: Subject to any disclaimer, the term of this patent is extended or adjusted under 35 U.S.C. 154(b) by 911 days.

(21) Appl. No.: 11/508,820

(22) Filed: Aug. 24, 2006

(65) Prior Publication Data
US 2007/0047821 A1 Mar. 1, 2007

(30) Foreign Application Priority Data
Aug. 26, 2005 (JP) .............................. 2005-246479

(51) Int. Cl.
*G06K 9/40* (2006.01)
(52) U.S. Cl. ...................... 382/254; 382/255; 382/256; 382/298; 382/302
(58) Field of Classification Search ................ 382/254, 382/255, 256, 298, 302
See application file for complete search history.

(56) References Cited

U.S. PATENT DOCUMENTS

| | | | | |
|---|---|---|---|---|
| 5,767,989 A | * | 6/1998 | Sakaguchi | .................. 358/474 |
| 6,907,141 B1 | | 6/2005 | Okamoto | |
| 2003/0184812 A1 | * | 10/2003 | Minakuti et al. | ............ 358/296 |
| 2005/0163391 A1 | * | 7/2005 | Ishida | ........................ 382/254 |

FOREIGN PATENT DOCUMENTS

| | | |
|---|---|---|
| JP | 2001-256244 A | 9/2001 |
| JP | 2003-199028 A | 7/2003 |

\* cited by examiner

*Primary Examiner*—Matthew C Bella
*Assistant Examiner*—Mike Rahmjoo
(74) *Attorney, Agent, or Firm*—Birch, Stewart, Kolasch & Birch, LLP

(57) ABSTRACT

According to the image processing apparatus, method and program of the present invention, images to be used can be automatically selected from inputted images for the number of images designated by a user. Moreover, a user can easily manually add an image to be used so that the number of images to be used is equal to or less than the number previously designated by the user.

20 Claims, 13 Drawing Sheets

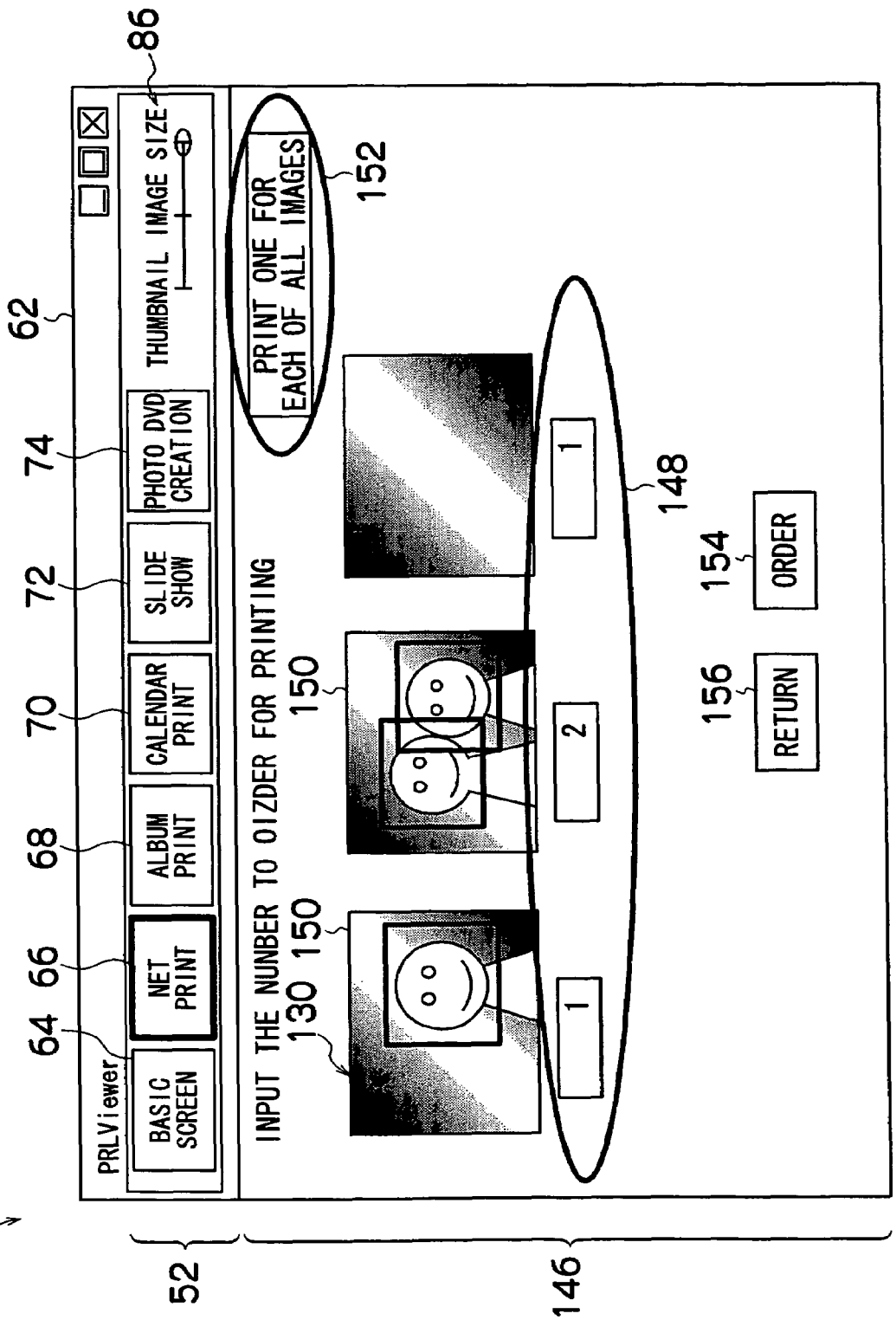

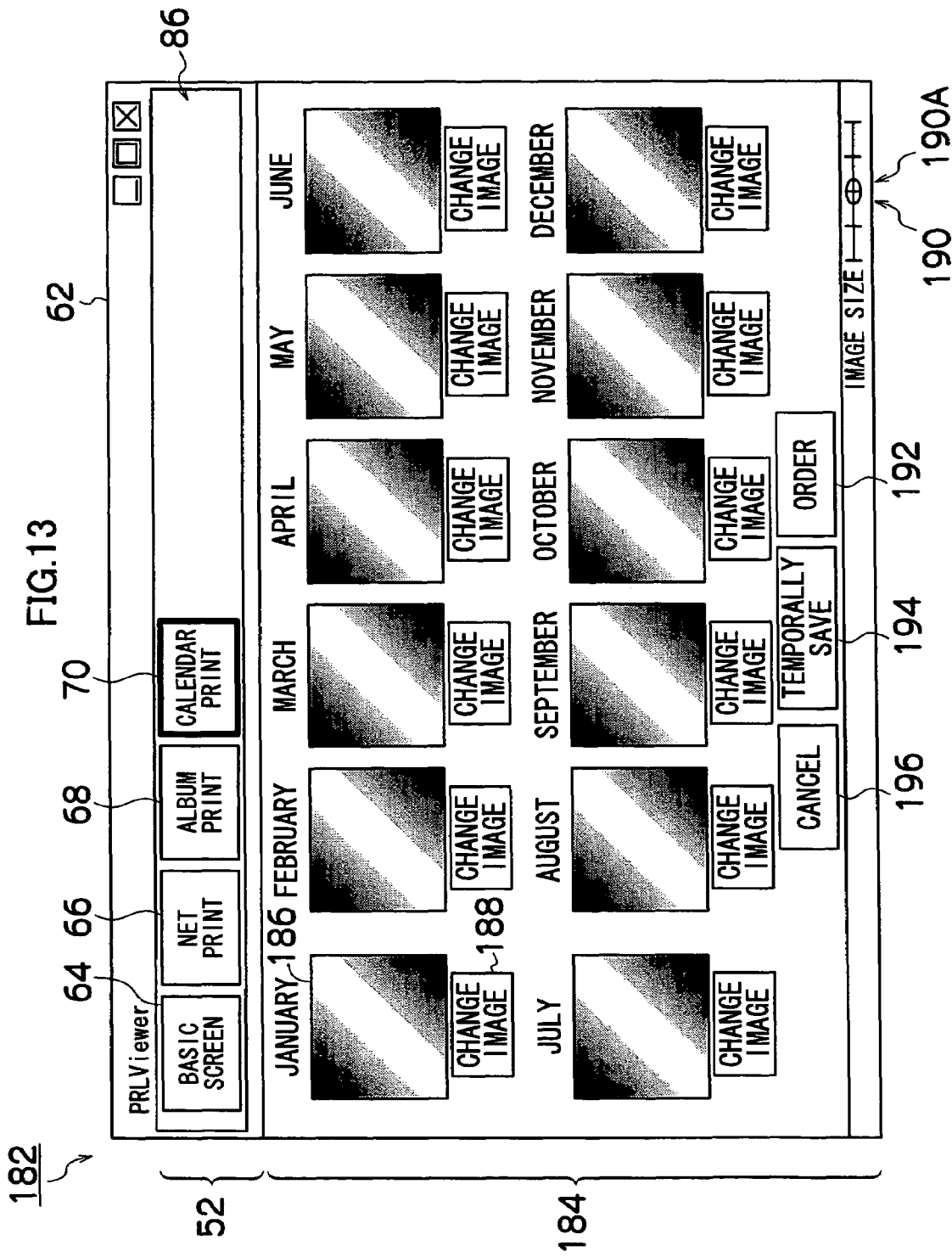

IMAGE PROCESSING APPARATUS, IMAGE PROCESSING METHOD AND IMAGE PROCESSING PROGRAM

BACKGROUND OF THE INVENTION

1. Field of the Invention

The present invention relates to an image processing apparatus, an image processing method and an image processing program, and more specifically to an image processing apparatus, an image processing method and an image processing program suitable for selecting a desired image.

2. Description of the Related Art

Image capturing apparatuses (electronic camera, etc.) which electronically capture an image have been widely used. For such electronic cameras, models that have good portability and can image a great deal of images have been developed. With such electronic cameras, a user can easily image an image. If images are easily captured in such a way, a device which records images such as a personal computer (PC) of a user stores a great deal of images. Accordingly, such an image capturing apparatus has a problem in that a user has a hard time in selecting images to save or print.

A technique which automatically sorts images has been proposed for solving the abovementioned problem. For example, Japanese Patent Application Laid-Open No. 2001-256244 discloses an image data sorting device which sorts image data by evaluating relationship between respective pieces of image data for characteristic quantity extracted from a plurality pieces of image data and clustering events represented by the characteristic quantity of each piece of the image data based on the evaluation result. Japanese Patent Application Laid-Open No. 2003-199028 discloses an electronic album device which sorts a plurality pieces of image data into groups for respective categories and manages the plurality pieces of image data by converting imaged images into electrically represented image data and recording the image data.

SUMMARY OF THE INVENTION

However, the techniques disclosed in the Japanese Patent Application Laid-Open No. 2001-256244 and Japanese Patent Application Laid-Open No. 2003-199028 are merely techniques which automatically sort images and do not present the sorted images effectively. Nor the techniques are for providing a GUI (Graphical User Interface) which enables a user to easily select the use for predetermined application purpose (for example, an image to print).

The present invention is adapted in view of such circumstances and an object thereof is to provide an image processing apparatus, an image processing method and an image processing program which enable a user to easily select an image to use for a predetermined application purpose from stored images.

In order to achieve the object, an image processing apparatus according to a first aspect of the present invention includes an image inputting device which inputs an image, an image displaying device which displays the inputted image, a quantity setting device which receives an input of a quantity of images to be used for a predetermined application purpose or an input of a ratio of a quantity of images to be used for the predetermined application purpose against a quantity of the all images inputted and sets the quantity of images to be used, a first image to be used selecting device which automatically selects a first image to be used according to a predetermined condition based on the set quantity of image to be used, and an image attribute setting device which sets an image attribute of the inputted initial image to an unselected state and sets an image attribute of the first image to be used to the first selection state.

The image processing apparatus according to the first aspect enables an image to be used that is used for a predetermined application purpose to be automatically selected by the user designated number of pieces of images from the inputted images.

The image processing apparatus according to a second aspect of the present invention is the image processing apparatus according to the first aspect, wherein the predetermined application purpose is at least one of printing or ordering to print the image to be used, recording the image to be used into a predetermined recording medium, copying or moving the image to be used to a predetermined folder, or creating contents using the image to be used. The second aspect of the present invention limits the predetermined application purpose of the first aspect.

The image processing apparatus according to a third aspect of the present invention is the image processing apparatus according to the first or second aspect, wherein the first image to be used selecting device selects a first image to be used based on at least a condition of prioritizing a portrait image for preferentially selecting an image in which a person is detected, prioritizing a landscape image for preferentially selecting an image in which no person is detected or an image in which a person occupies a little ratio in the image, prioritizing a latest image for preferentially selecting an image whose taken or saved date and time is new, and prioritizing an old image for preferentially selecting an image whose taken or saved date and time is old. The third aspect lists up conditions to be a standard for the first image to be used selecting device to select a first image to be used.

The image processing apparatus according to a fourth aspect of the present invention is the image processing apparatus according to the first to third aspects, further including a second image to be used selecting device which selects a second image to be used based on an designation inputted from a user and a quantity change device which changes a quantity of the first image to be used so that the sum of quantities of the first and second images to be used is the set quantity or less, wherein the image attribute setting device sets the image attribute of the second image to be used to a second selection state.

The image processing apparatus according to the fourth aspect enables a user to manually select an image to be used by using a pointing device such as a mouse or the like. Moreover, when an image to be used is automatically selected and then manually selected, the number of the first images to be used can be reduced so that the sum of the first and the second image to be used (total number) is the previously designated number or less. When the first image to be used is reduced, the image processing apparatus preferably order the first images to be used based on conditions indicated in the third aspect and release selection of the first images in the ascending order, for example. The ordering is preferably done based on the descending order of conditions of images such as focus or brightness, contrast, sharpness, camera shake, for example.

The image processing apparatus according to a fifth aspect of the present invention is the image processing apparatus according the first to fourth aspects, further including an operation device which adds predetermined operation to the first or second image to be used, wherein the image attribute setting device sets an image attribute of the first or second image to be used to which the predetermined operation is applied to a non-selected state which is not selected by the first image to be used selection device.

The image processing apparatus according to the fourth aspect can enable a user to prevent an image the user does not like from being selected when the user executes the automatic selection again, when the user does not like the automatically selected image to be used.

The image processing apparatus according to a sixth aspect of the present invention is the image processing apparatus according to the fifth aspect, wherein the image attribute setting device sets the image attribute of the image in the non-selected state to which the predetermined operation is applied to an unselected state.

The image processing apparatus according to the sixth aspect enables a user to change the image attribute from the non-selected state to the unselected state.

The image processing apparatus according to a seventh aspect of the present invention is the image processing apparatus according to the first to sixth aspects, further including a display control device which displays the image distinguishable according to the image attribute.

The image processing apparatus according to the seventh aspect can enable a user to visually distinguish image attributes (selection states).

The image processing apparatus according to an eighth aspect of the present invention is the image processing apparatus according to the seventh aspect, wherein the display control device varies at least one of a frame color, a shape, shading, an underline, a checkbox added to the image or an icon added to the image according to the image attribute. The eighth aspect limits the aspects of displays that can distinguish image attributes in the seventh aspect.

An image processing method according to a ninth aspect of the present invention includes the steps of (a) inputting an image, (b) displaying the inputted image, (c) receiving an input of a quantity of images to be used for a predetermined application purpose or an input of a ratio of a quantity of images to be used for the predetermined application purpose against a quantity of the all images inputted and setting the quantity of images to be used, (d) automatically selecting a first image to be used according to a predetermined condition based on the set quantity of image to be used, and (e) setting an image attribute of the inputted initial image to an unselected state and setting an image attribute of the first image to be used to the first selection state.

The image processing method according to a tenth aspect of the present invention is the image processing method according to the ninth aspect, further including the steps of (f) selecting a second image to be used based on the designation inputted by a user, (g) changing the quantity of the first image to be used so that the sum of the first and second images to be used is equal to or less than the quantity set at the step (c), and (h) setting the image attribute of the second image to be used to the second selection state.

The image processing method according to an eleventh aspect of the present invention is the image processing method according to the ninth or tenth aspect, further including the step of displaying the image distinguishable according to the image attribute.

An image processing program according to a twelfth aspect of the present invention causes a computer to execute an image inputting function which inputs an image, an image displaying function which displays the inputted image, a quantity setting function which receives an input of a quantity of images to be used for a predetermined application purpose or an input of a ratio of a quantity of images to be used for the predetermined application purpose against a quantity of the all images inputted and sets the quantity of images to be used, a first image to be used selecting function which automatically selects a first image to be used according to a predetermined condition based on the set quantity of image to be used, and a first image attribute setting function which sets an image attribute of the inputted initial image as an unselected state and sets an image attribute of the first image to be used to the first selection state.

The image processing program according to a thirteenth aspect of the present invention is the image processing program according to the twelfth aspect, causing a computer to execute a second image to be used selecting function which selects the second image to be used based on the designation inputted by a user, quantity change function which changes a quantity of the first image to be used so that the sum of quantities of the first and second images to be used is equal to or less than the quantity set, and a second image attribute setting function which sets the image attribute of the second image to be used to a second selection state.

The image processing program according to a fourteenth aspect of the present invention is the image processing program according to the twelfth or thirteenth aspect causing a computer to execute a displaying control function which displays the image distinguishable according to the image attribute.

The image processing apparatus and the image processing method according to the present invention can be realized by applying a software program or a firmware program including an image processing program according to the twelfth to fourteen aspects to a device with an image playing function such as a video playing device (video cassette recorder, television) or a digital camera, a personal digital assistant (PDA), a portable photo-player, a cellular phone or the like as well as a personal computer (PC).

According to the present invention, images to be used can be automatically selected from inputted images for the number of images designated by a user. According to the embodiment, a user can easily manually add an image to be used so that the number of images to be used is equal to or less than the number previously designated by the user.

BRIEF DESCRIPTION OF THE DRAWINGS

FIG. 11 is a diagram showing a print order screen;

FIG. 13 is a diagram showing a calendar print screen.

DETAILED DESCRIPTION OF THE PREFERRED EMBODIMENTS

Preferred embodiments of the image processing apparatus, the image processing method and the image processing program according to the present invention will be described according to the attached drawings.

Figure 1:
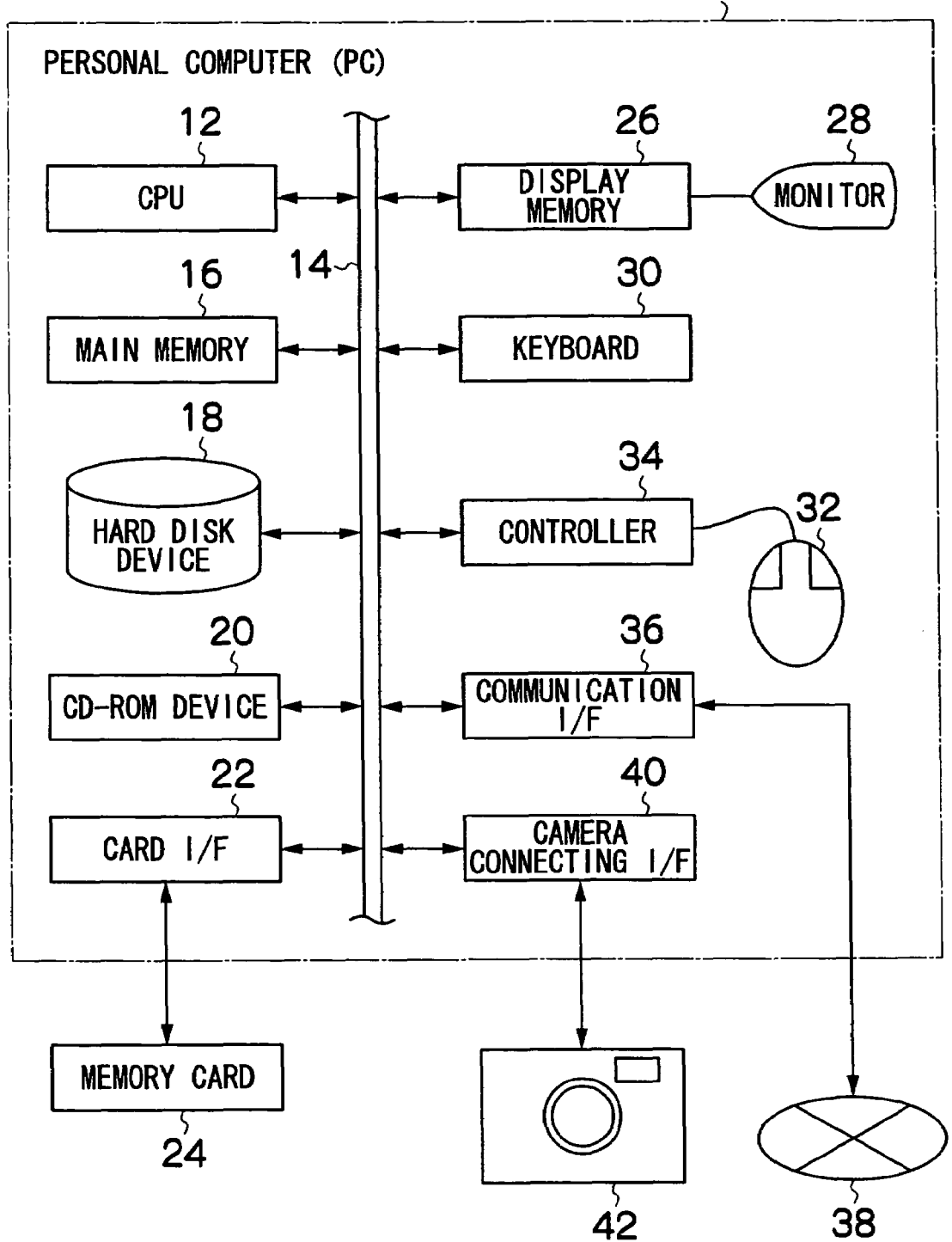
FIG. 1 is a block diagram showing a main configuration of an image processing apparatus according to an embodiment of the present invention.

FIG. 1 is a block diagram showing a main configuration of an image processing apparatus according to an embodiment of the present invention. The image processing apparatus 10 includes for example, a personal computer (PC) or the like which execute sorting, correcting or print ordering of images. As shown in FIG. 1, a central processing unit (CPU) 12 which controls operation of each block in the image processing apparatus 10 is connected with each block via a bus 14. Main memory 16 includes a storage area which stores a control program or an operation area used when a program is executed. A hard disk device 18 stores an operating system (OS) of the image processing apparatus 10, an image processing program according to the present invention, various types of application software programs and the like. A CD-ROM device 20 reads in data from a CD-ROM (not shown). The image processing program according to the present invention can be installed into the image processing apparatus 10 when the CD-ROM recording the image processing program is set into the CD-ROM device 20. A card interface unit (card I/F) 22 reads image data from a memory card 24. A display memory 26 temporally stores display data. A monitor device 28 is a CRT (Cathode Ray Tube) monitor or a liquid crystal monitor which displays images, characters or the like based on image data or character data outputted from the display memory 26. A keyboard 30 or a mouse 32 receives operation input from an operator and inputs a signal according to the operation input to the CPU 12. A mouse controller 34 outputs signals of a location of a mouse pointer on the monitor device 28 and a state of the mouse 32 to the CPU 12 by detecting the state of the mouse 32. A communication interface unit (communication I/F) 36 communicates with a network 38. A camera connecting interface unit (I/F) 40 communicates with an imaging device (electronic camera, digital camera) 42.

The image processing apparatus 10 of the FIG. 1 can use a touch panel, a touch pad or the like as well as the mouse 32 as a pointing device.

Figure 2:
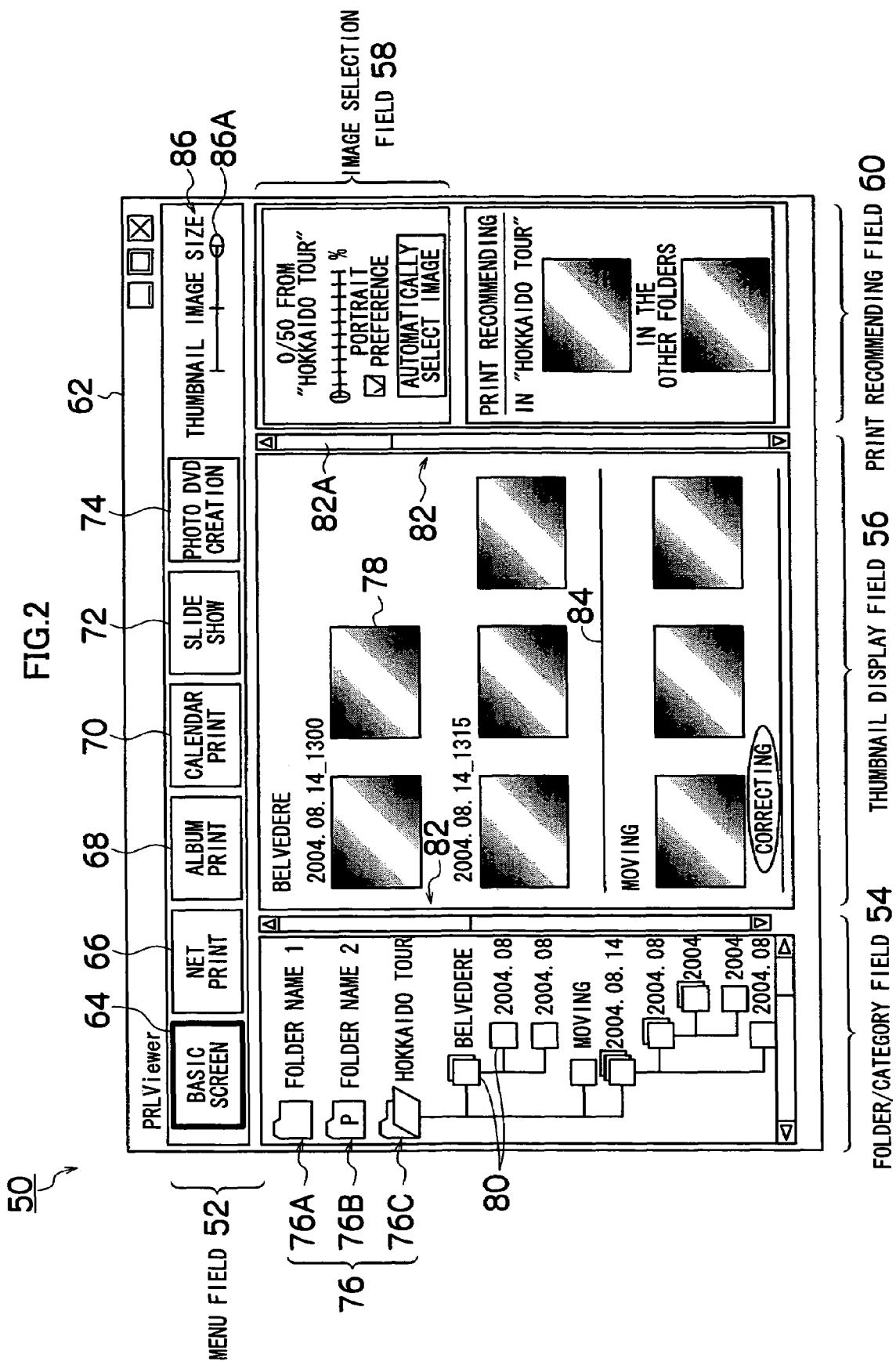
FIG. 2 is a diagram showing a basic screen.

An image processing flow will be described with reference to FIG. 2 and following figures. FIG. 2 is a diagram showing a basic screen. A basic screen 50 shown in FIG. 2 is used as a GUI (Graphical User Interface) for mainly selecting a print image, having a menu field 52, a folder category field 54, a thumbnail display field 56, an image selecting field 58, and a print recommending field 60. The reference numeral 62 in the figure denotes a title bar which displays the name of the image processing program of the present invention, having a minimization button which minimizes a screen (displaying a screen as an icon), a maximization button which maximizes a screen, an end button which ends the image processing program. A configuration of the title bar 62 may be different depending on an operation system (OS) of the PC comprising the image processing apparatus 10.

In the menu field 52, menu buttons for transferring the screen to another screen are displayed. In FIG. 2, a basic screen button 64 for transferring the screen to a basic screen, a net print screen button 66 for transferring the screen to a net print screen, an album print screen button 68 for transferring the screen to an album print screen, a calendar print screen button 70 for transferring the screen to an album print screen, a slide show button 72 for transferring the screen to a slide show of images, and a photo DVD creating screen button 74 for transferring the screen to a photo DVD creating screen are displayed as menu buttons. The basic screen button 64 is highlighted when the basic screen 60 is displayed. The color of the basic screen button 64 or the color of the frame of the basic screen button 64, for example, is changed to a color different from that of the other menu buttons when the button is highlighted. Configuration of each of the transferred screens will be described later.

In the folder category field 54, an icon (folder icon) 76 of a folder which stores images is displayed. In FIG. 2, a folder icon 76A indicates a folder including no image which has been ordered for printing, while a folder icon 76B indicates a folder including an image which has been ordered for printing. Accordingly, even if a great deal of images are stored, a user can easily recognize a folder whose images have not been ordered.

When the folder icon 76 is clicked by the mouse 32 or indicated by operation input from the keyboard 30, the folder icon changes its shape as denoted by the reference numeral 76C, indicating that the folder is selected, and a thumbnail images 78 of images in the selected folder (description hereinafter, referred to as a selected folder) are displayed in a thumbnail display field 56. Here, images in the selected folders are automatically sorted based on date information on image data (date and time of imaging or date and time of updating or saving) or place information on the imaging place (GPS information; Global Positioning System) and classified into a predetermined categories and displayed. The above-mentioned time information or the GPS information is obtained from information included in the EXIF (Exchangeable Image File Format) tag of image data, for example.

If images are sorted based on the date and time information, images in a selected folder are classified into different categories for each of the predetermined time intervals in a selected folder (for example, 15 minuets, 30 minuets, an hour). Here, the name of the category into which images are classified (category name) is set by a character string indicating date and time of imaging. For example, images taken in a predetermined time period (for example, 15 minuets) from 13:00 on Aug. $14^{th}$, 2004 will be categorized in "2004. 08. 14__1300". The time period in which the number of taken images is much may be classified by a short time period (for example, by 15 minuets) and the time period in which the number of taken images is a few may be classified by a long time period (for example, by an hour). The category may have hierarchical arrangement provided with categories for each 15 minuets under categories for each hour.

If images are sorted based on place information, images in a selected folder are classified into different categories for each of the places where the images are taken, and names of the categories into which images are classified are set by character strings indicating the place information.

Images in the selected folder may be classified into different categories by predetermined number of images (for example, 10 images, 20 images). For example, images in which the same object (building, person or the like) is detected or images determined as similar to each other based on a difference of images, hue or the like by image analysis maybe classified into the same category. Further, conditions of these category classifications may be combined to be used. That is to say, the topmost category classification may be executed based on place information, then, the next top category classification may be executed based on date and time information.

Images in the selected folder may be sorted according to event information of the images. The event information is information indicating a scene of taking an image described on a tag of the image (for example, "Hokkaido tour"). The event information is information included in a tag as character information, reference numerals or the like, and can be manually or automatically inputted by using an imaging device or the image processing apparatus 10 of this embodiment when an image is taken. The event information may be a combination of pieces of tag information on images. As event information, for example, a combination of place information and time information included in the image can be used. For example, image taken in a time period of a predetermined range at a predetermined place in a predetermined range are treated as having the same event information. Specifically, images taken in XX City in Hokkaido for X days from YY/MM/DD are treated as the same event. That enables images to be automatically sorted for each piece of event information. The event information may be combined as a character or an image in the image.

The category generated in this manner has a hierarchical structure, icons (category icons) 80 of the category are displayed in a tree structure in the folder category field 54, while thumbnail images 78 are displayed in the thumbnail display field 56 for each category. The category icons 80 are different for the number of images in the category. In FIG. 2, the category icons 80 are represented by overlapped rectangles. The more the number of images in a category, the more the number of rectangles overlapped.

When the category icons 80 is clicked (single click) by the mouse 32 in the folder category field 54, the display of the thumbnail images 78 is scrolled so that the top of the category selected in the thumbnail display field 56 is displayed.

The thumbnail images 78 are displayed with category names (heading) or icons different for respective category name (for example, icons different for respective standards for sorting categories) and divided with a line 84 for each hierarchy of folders or categories in the thumbnail display field 56. The line 84 has a shape different for each hierarchy of categories divided, such as a solid line between topmost categories and a dotted line between the second highest hierarchies. As a line 84, an image in an appropriate shape (for example, a stick shape) may be used. A user can adjust the size of the thumbnail images 78 displayed in the thumbnail display field 56 by dragging a slider 86A of a thumbnail image size adjustment switch 86 in the menu field 52.

In the folder category field 54 and the thumbnail display field 56, a scroll bar 82 is displayed as required. A user can view a folder icons 76 or thumbnail images 78 by dragging a scroll bar slider 82A in the scroll bar 82 by using the mouse 32.

Figure 3:
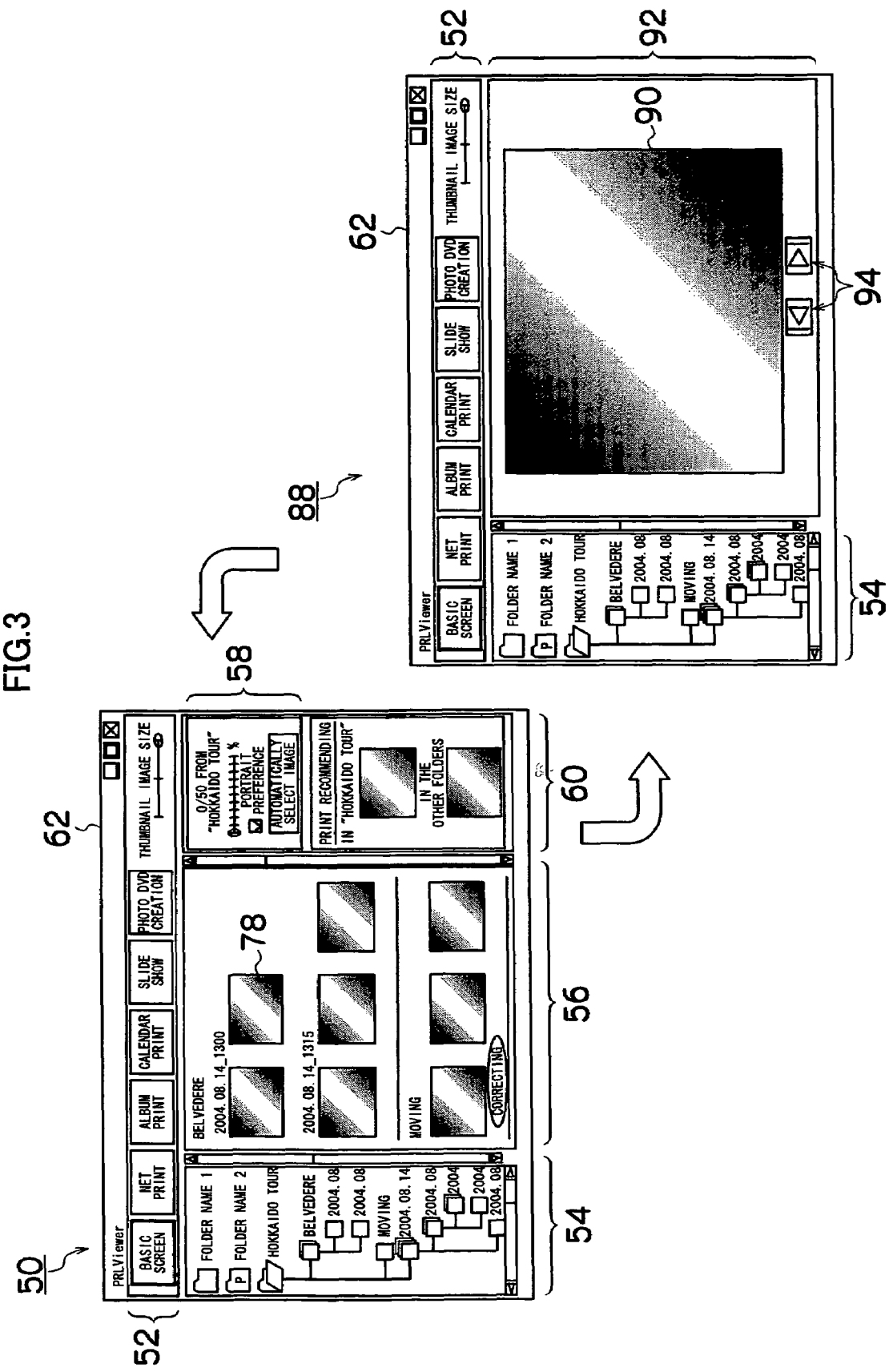
FIG. 3 is a diagram showing an enlarged display screen.

When the thumbnail image 78 is clicked by the mouse 32 in the thumbnail display field 56 in a basic screen 50, the screen is transferred to an enlarged display screen 88 as shown in FIG. 3. The enlarged display screen 88 shown in FIG. 3 has an enlarged display field 92 in which an image 90 corresponding to the double clicked thumbnail image 78 is enlarged. A user can see detail of the image 90. When the image 90 is double clicked by the mouse 32, the screen returns to the basic screen 50. In the enlarged display screen 88, the reference numeral 94 in FIG. 3 indicates frame step buttons. A user can make images in the selected folder displayed in the enlarged display field 92 in order by clicking the mouse 32 on either of the frame step buttons 94. In the enlarged display screen 88, the menu field 52, the folder category field 54, and the title bar 62 are the same as those in the basic screen.

Figure 4:
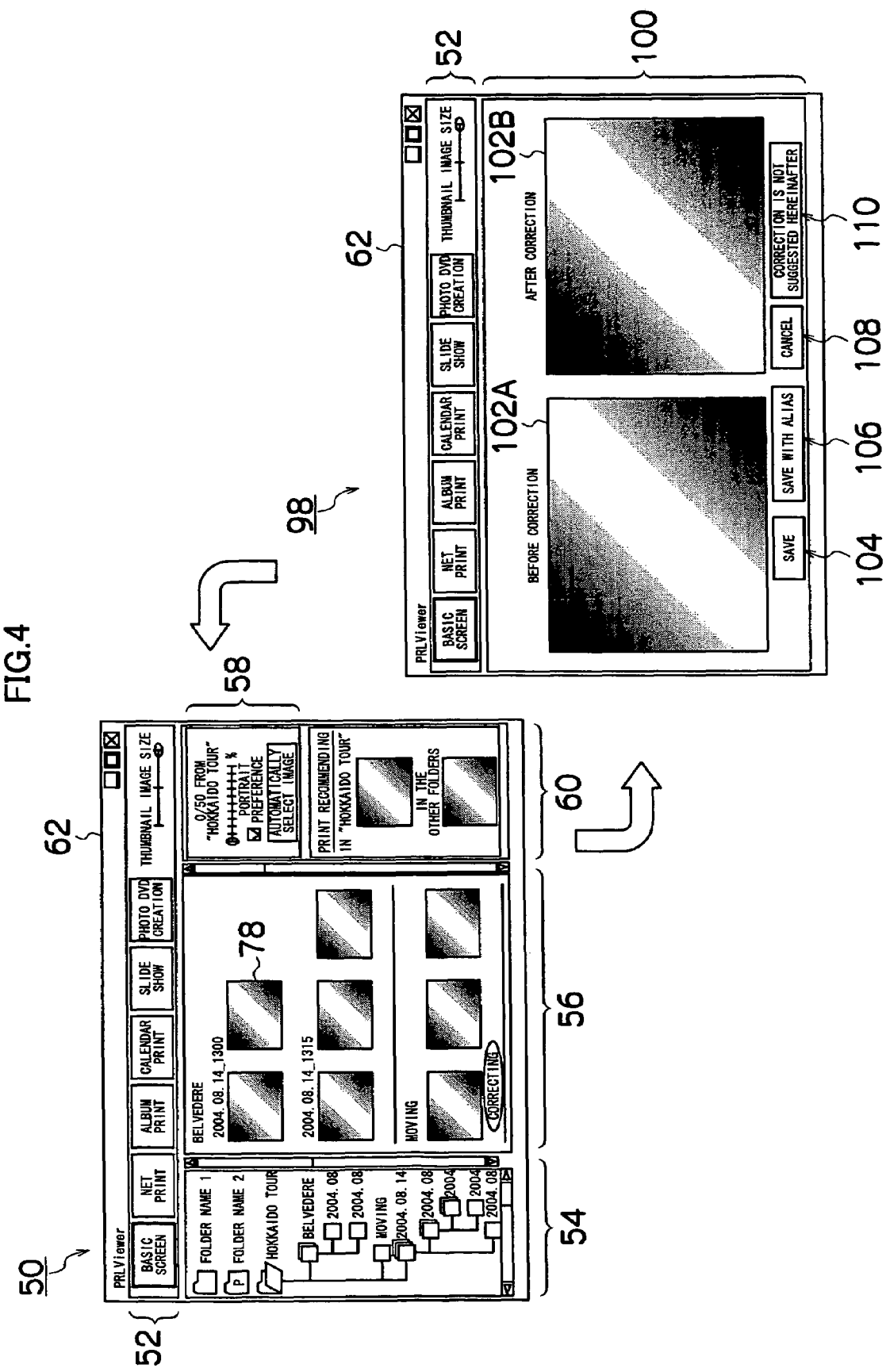
FIG. 4 is a diagram showing an image correction screen.

The image processing apparatus 10 of the embodiment automatically analyses an image, detects a state such as focus, brightness, contrast, sharpness, camera shake or the like, and determines whether the image should be corrected or not. If it is determined that the image should be corrected, a correction suggesting mark 96 is given to near the thumbnail image 78 in the thumbnail display field 56 of the basic screen 50. When the correction suggesting mark 96 is clicked by the mouse 32, the display is transferred to an image correction screen 98 shown in FIG. 4. The image correction screen 98 has the menu field 52, the title bar 62, and the image correction field 100. In the image correction field 100, an image 102A with a correction suggesting mark 96 and an image 102B after the image 102A is corrected are enlarged and displayed side by side. When a save button 104 in FIG. 4 is clicked by the mouse 32, the corrected image 102B is overwritten and saved on the original image and the display returns to the basic screen 50. When a save with alias button 106 is clicked, the corrected image 102B is saved as an alias file and the display is transferred to the basic screen 50 again, where the correction suggesting mark 96 by the original thumbnail screen 78 is not displayed. When a cancel button 108 is clicked, images are not corrected and the display is transferred to the basic screen 50 again, where correction suggesting mark 96 by the thumbnail image 78 is left displayed in the basic screen 50. When correction is not suggested hereafter button 110 is clicked, the image is not corrected and the display is transferred to the basic screen 50 again, where the correction suggesting mark 96 by the thumbnail image 78 is not displayed in the basic screen 50.

In the image selecting field 58, operational members to be used in selecting an image to order for printing are displayed. In the print recommending field 60, print recommended images automatically selected by the image processing apparatus 10 are displayed. The image selecting field 58 and the print recommending field 60 will be described later.

Figure 5:
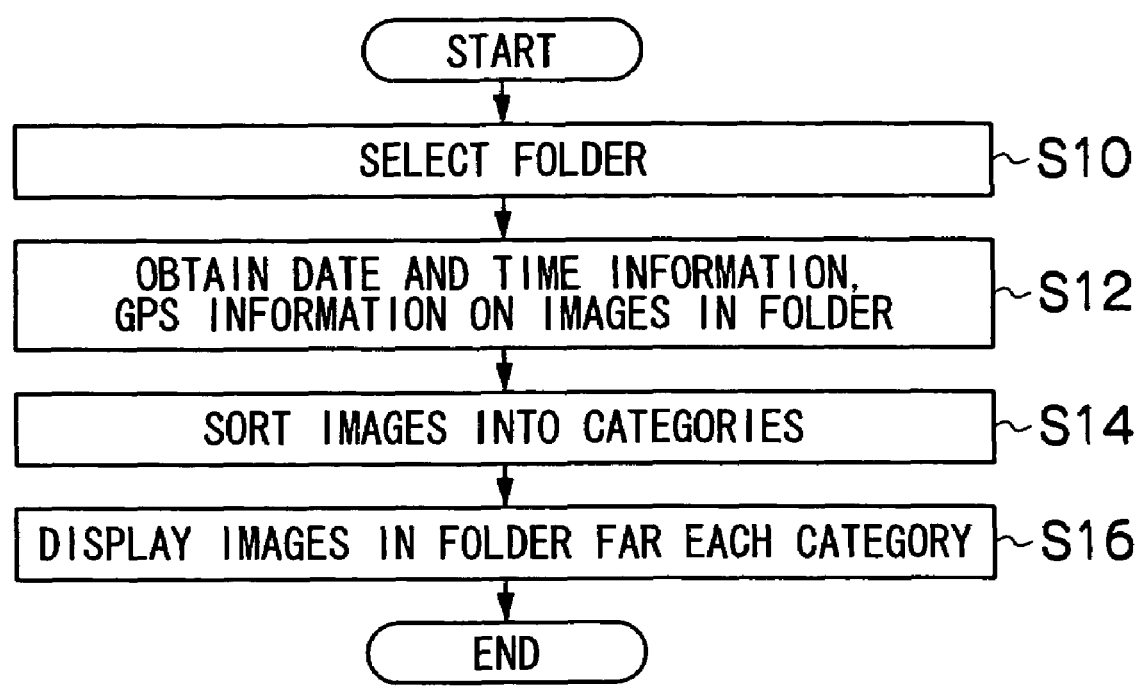
FIG. 5 is a flowchart showing a processing flow in sorting images into categories.

A processing flow in sorting images into categories will be described with reference to FIG. 5. FIG. 5 is a flowchart showing a processing flow in sorting images into categories. First, a folder is selected when the folder icon 76 is clicked by the mouse 32 or indicated by an operational input from a keyboard 30 (step S10). Then, date and time information or GPS information is obtained from images stored in the selected folder (step S12). Next, images in the selected folder are sorted into categories based on the date and time information or the GPS information and the number of the images (step S14). In the folder category field 54, icons of the category (category icons) 80 are displayed in a tree structure, while thumbnail images 78 are displayed for each category in the thumbnail display field 56 (step S16).

According to the embodiment, images in a selected folder are automatically sorted based on its date and time information and its place information, classified into categories with date and time of taking images and names of places where the images are taken, and displayed. A user can easily view images or select an image to be saved or printed.

Classifying processing of images shown in FIG. 5 may be executed each time the folder icon 76 is selected. Alternatively, sorted result of the categories for the folders in which images have been sorted is saved so as not to execute the sorting again. When an image is added to a folder in which images have been sorted, the images may be sorted again, or the added image may be sorted in an existing category, or the added image may be sorted in a new category instead of an existing category.

In FIG. 2, a user can change the category name to any name from the keyboard 30 after clicking (single clicking) the mouse 32 on a category name displayed on the right to a category icon 80 and selecting the name. A user may also change the folder name in the similar way.

Figure 6:
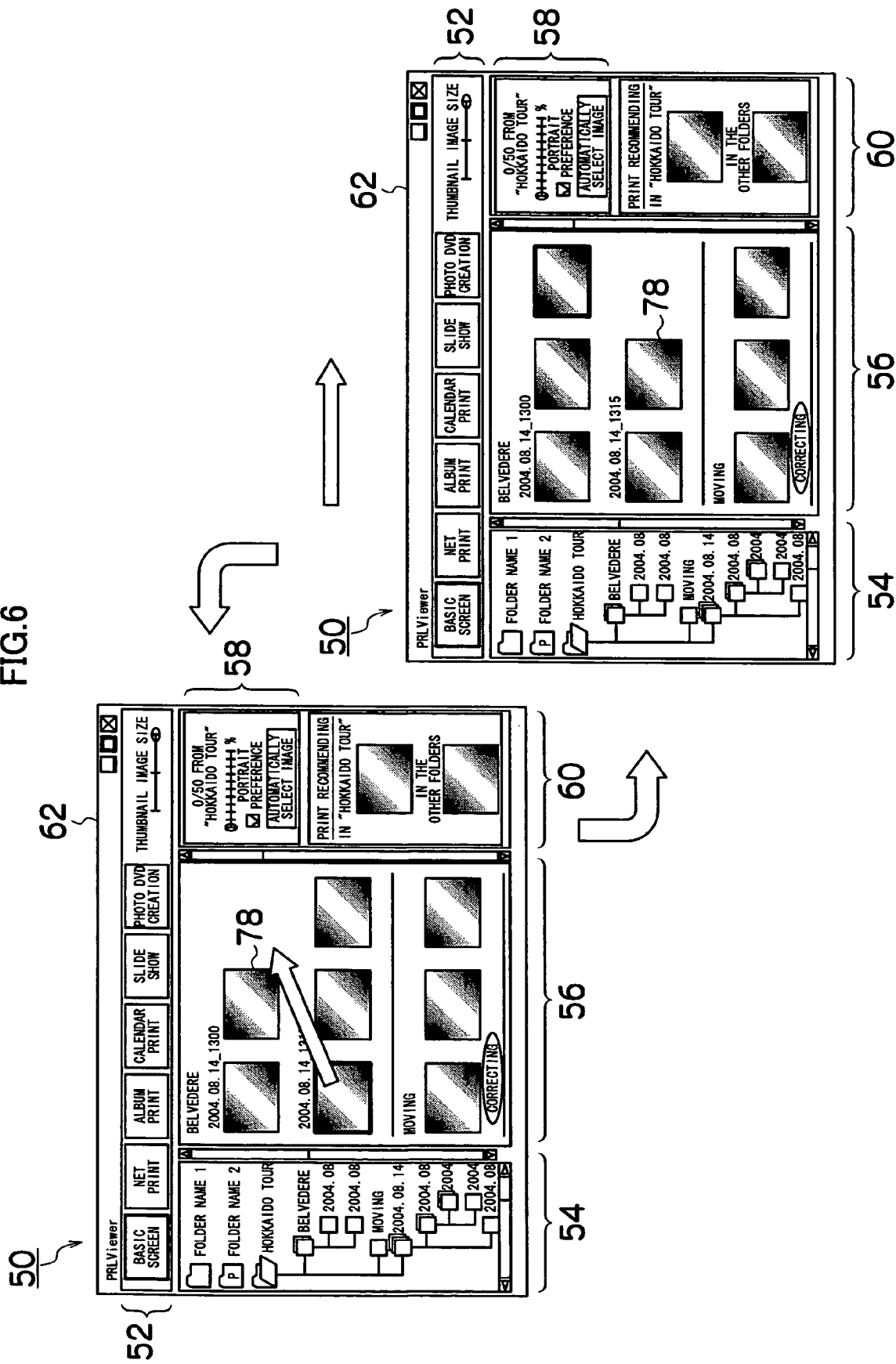
FIG. 6 is a diagram schematically showing a procedure which moves a category of images in the basic screen 50.

As shown in FIG. 6, a user can move the image automatically sorted in the abovementioned manner by dragging its thumbnail image 78 in the thumbnail display field 56 by using the mouse 32.

When the category icon 80 or the category name is clicked by the mouse 32, a menu for a user to add, delete or move categories is displayed. When a user selects a category addition in the menu by using the mouse 32, a new category is created under the selected category. When a user selects a category deletion in the menu by using the mouse 32, the selected category is deleted. All the images or categories (sub categories) in the category to be deleted are deleted. When a user selects a category move in the menu by using the mouse 32, a screen for the user to designate a destination of the move is displayed. When a user designates a folder or a category of a destination of the move, the category moves to the designated folder or category.

Figure 7:
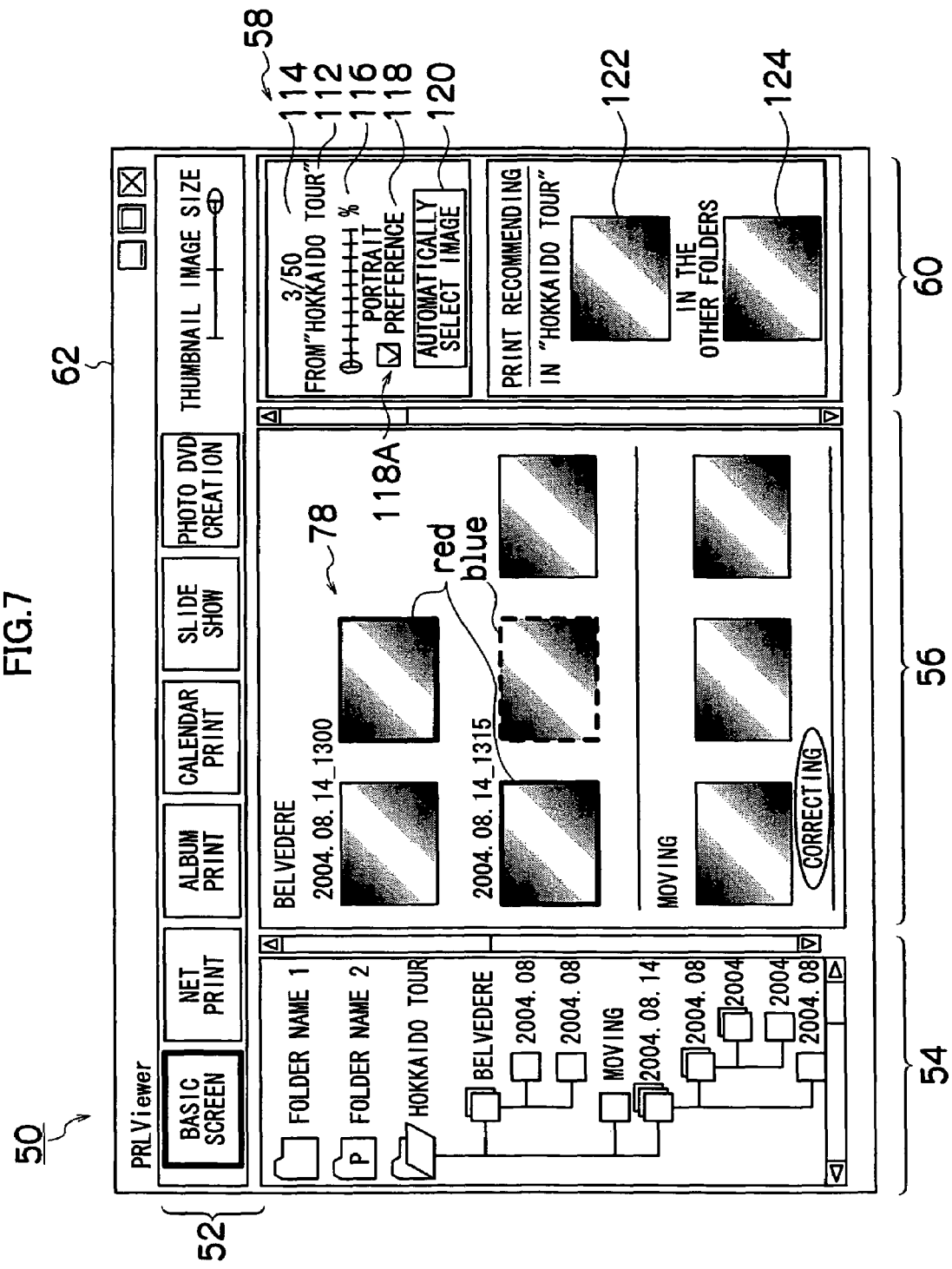
FIG. 7 is a diagram illustrating the image selection field 58 in the basic screen 50.

Now, a procedure for a user to select an image to order for printing will be described with reference to FIGS. 7 and 8. FIG. 7 is a diagram for illustrating the image selection field 58 in the basic screen 50. As shown in FIG. 7, in the image selection field 58, a selected folder name field 112, a number of images designating field 114, a ratio designating field 116, a condition designating field 118 and an automatic selection button 120 are arranged.

In the selected folder name field 112, a folder name (for example, "Hokkaido tour") of the selected folder is displayed when the folder icon 76 is selected in the folder category field 54. When the automatic selection button 120 is clicked by the mouse 32, the image processing apparatus 10 automatically selects an image that is a candidate for the printing order (print candidate image) from a selected folder. When automatic selection is executed in the above mentioned manner, the thumbnail image 78 of the automatically selected print candidate image is framed in blue as shown in FIG. 7. The number of the automatically selected print candidate images is displayed in the category icon 80 or by the category name in the folder category field 54. The number of the print candidate images may be displayed by the category name or at the end of each category name in the thumbnail display field 56.

A user can designate the number of print candidate images to be automatically selected by inputting the number in the number of images designating field 114 from the keyboard 30. A user can also designate a ratio of "the number of the print candidate images to be automatically selected" against "the number of all the images in the folder" by sliding a slider of the ratio designating field 116.

A user can also designate conditions (automatic selection conditions) for automatically selecting print candidate images by using the condition designation field 118. Here, the automatic selection conditions are such as portrait preference, specific person preference, landscape preference, latest image preference, old image preference, image included in a selected folder or a selected category preference, image included in a non-selected folder or a non-selected category. A user can select the conditions by clicking a check box attached to each condition by the mouse 32. In FIG. 7, only portrait preference is shown as automatic selection conditions.

Each of the automatic selection conditions will be described below. When a check box to the portrait preference is checked, the image processing apparatus 10 analyzes the image in the selection folder when the automatic selection is executed, and preferentially selects an image in which a person is detected (for example, in descending order of the number of persons). When a check box of the specific person preference is checked, the image processing apparatus 10 analyzes the images in the selected folder when the automatic selection is executed, and preferentially selects an image of a person (for example, the user, the user's family or the user's friend) whose image is previously registered in the image processing apparatus 10. When a check box of the landscape preference is checked, the image processing apparatus 10 analyzes the images in the selected folder when the automatic selection is executed, and preferentially selects an image in which no person is detected or an image in which a ratio (area) of the background (landscape) against a person(s) is large. When a check box of the latest image preference or the old image preference is checked, images are selected from the latest one or the oldest one in order based on the date and time information when the automatic selection is executed. When a check box of image preference included in the selected folder or the selected category is checked, images in the folder or the category selected in the folder category field 54 are preferentially selected when the automatic selection is executed. When a check box of the image preference included in the non-selected folder or the non-selected category is checked, images in the folder or category which are not selected in the folder category field 54 are preferentially selected when automatic selection is executed.

A user can also directly select a print candidate image by clicking its thumbnail image 78 by using the mouse 32. The thumbnail image 78 which is directly selected by the user is framed in red. When a user directly selects print candidate images, the number of print candidate images that have been selected by the user and the number of images that is automatically selected are summed and displayed on the category icon 80 of the folder category field 54.

Figure 8:
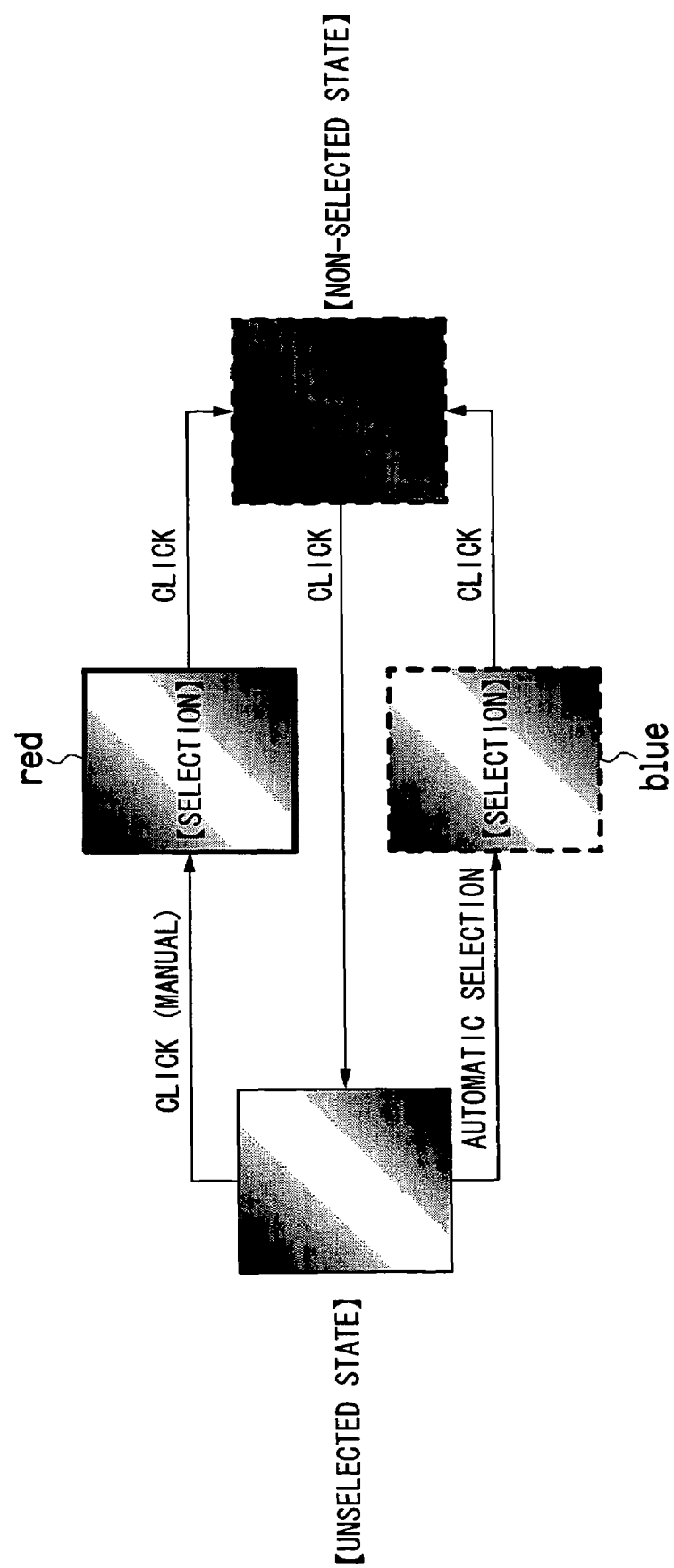
FIG. 8 is a diagram schematically showing a selection state of the thumbnail images 78.

FIG. 8 is a diagram schematically showing a selection state of the thumbnail images 78. As mentioned above, when a user manually selects an unselected thumbnail image 78 which has neither automatically nor manually been selected, the thumbnail image 78 is framed in red. On the other hand, when the image processing apparatus 10 automatically selects a print candidate image, the thumbnail image 78 is framed in blue. If the abovementioned thumbnail image 78 framed in red or blue is clicked again, the thumbnail image 78 enters into a non-selected state. A thumbnail image 78 in a non-selected state is subjected to shading process or changed into grayish color and excluded from the objects of the abovementioned automatic selection. If the thumbnail image 78 in the non-selected state is clicked, the thumbnail image 78 enters into the unselected state.

According to the embodiment, a user can make a print candidate image automatically selected by designating desired conditions of desired automatic selection, the number of images and a ratio. Print candidate images that are automatically selected by the image processing apparatus 10 and print candidate images that are manually selected can be distinguished by the color of their frames.

Further, according to the embodiment, the number of print candidate images that have been automatically or manually selected in each category is displayed in the category icon 80 or the like. A user can adjust the selection so that the print candidate images are selected from all over the categories by referencing the number. That is to say, a user can avoid selection in which print candidate images are not selected from a particular category.

Means to indicate selection states of images are not limited to the abovementioned blue frame, red frame or shading. The thumbnail image 78 can be provided with shading, an underline, a check box, and an icon whose color or shape changes according to the selection state, or the like to indicate the selection state of the image, or a file name is added near the thumbnail image 78 to indicate the selection state of the image by the color of the file name, or shading or an underline given to the file name.

In the example mentioned above, when the print candidate image is automatically selected and then some are manually selected further from the automatically selected images, a user preferably reduces the number of the automatically selected print candidate images so that the total number of print candidate images is equal to or less than the previously designated number. When a user reduces the number of the automatically selected print candidate image, the user preferably sequences the automatically selected print candidate images based on the abovementioned automatic selection conditions and make the selection released in the ascending order. The sequence is made in the descending order of the number of persons in the picture or the descending order of the ratio (area) of the persons against the entire image in the case of the portrait preference; in the descending order of the ratio (area) of a specific person against the entire image in the case of the specific person preference; in the descending order of the ratio (area) of backgrounds against the entire image in the case of the landscape preference; and in the order from the latest image or the oldest image in the case of the latest image preference or the oldest image preference. The sequence may be done based on the descending order of the state of the image such as focus, brightness, contrast, sharpness, camera shake or the like, for example.

Next, a print recommending field 60 will be described with reference to FIG. 7. As shown in FIG. 7, in the print recommending field 60, print recommended images (122 and 124 respectively) that are automatically selected from images in the selected folder and the folders other than the selected folder (the other folders) by the image processing apparatus 10 are displayed. The print recommended image 122 that is automatically selected from the selection folder is selected from the images that are neither automatically nor manually selected from the selected folder (i.e., not framed in blue nor red). As the print recommended images 122 and 124, images including an object (for example, a person or a building) that is taken for many times in the images in the selected folder or images in which an objective person has a characteristic expression are selected according to image analysis in each folder and displayed in the print recommending field 60 in the descending order of states of images such as focus, brightness, contrast, sharpness, camera shake or the like. The image in which an objective person has a characteristic expression includes such a face as with nice expression (smile), weeping expression, angry expression, or a face facing to front. That is detected by the positions of the tails of the eyes, corners of the mouse, or how much the person shows his/her teeth. Alternatively, an image in which a person who is frequently taken other than the person whose image is previously registered (for example, the user, the user's family, the user's friend or the like) may be displayed in the print recommending field 60.

Although print recommended images 122 and 124 are displayed one by one in FIG. 7, a plurality of images may be displayed in the descending order of the state. The number of print recommended images 122 and 124 displayed in the print recommending field 60 may be adjusted by operational member such as the abovementioned number of images designating field 114 or ratio designating field 116.

When the print recommended image 122 or 124 is clicked by the mouse 32, the folder category field 54 and the thumbnail display field 56 are automatically scrolled so that the clicked print recommended image (122 or 124) can be seen. Accordingly, a user can easily view the print recommended images 122 and 124 and the images around them in the thumbnail display field 56. When a user clicks the mouse on the print recommended image 122 or 124 in the thumbnail display field 56 and manually selects one as print candidate image, the print recommending field 60 is updated and the selected print recommended image (122 or 124) are exchanged with another image (for example, an image in the next good state).

When the print recommended image 122 or 124 is clicked by the mouse 32 and then the automatic selection button 120 of the image is clicked and automatic selection is executed, an image is automatically selected based on selection conditions when the clicked print recommended image 122 or 124 is selected (for example, taken picture many times or has characteristic expression). An image selected in this way is also framed in blue. When a user does automatic selection by selection conditions of the print recommended image 122 or 124, the user can designate the number of images by the number designating field 114 or the ratio designating field 116. When the number of images are not designated before the automatic selection is executed, a message which prompts a user to designate the number of images (for example, a message box, or highlighting or blinking of the number of images designating field 114 or the ratio designating field 116) is preferably displayed.

According to the embodiment, a print recommended image can be selected based on a viewpoint other than a preference of a user such as automatic selection conditions designated by the user and presented to the user. The print recommended image can be selected from a folder other than the selected folder and presented to a user. As such; the sales promoting effect which presents images appropriate to be printed or attractive images other than those selected by the user and increases the number of images to be ordered for printing can be expected to the embodiment.

Figure 9:
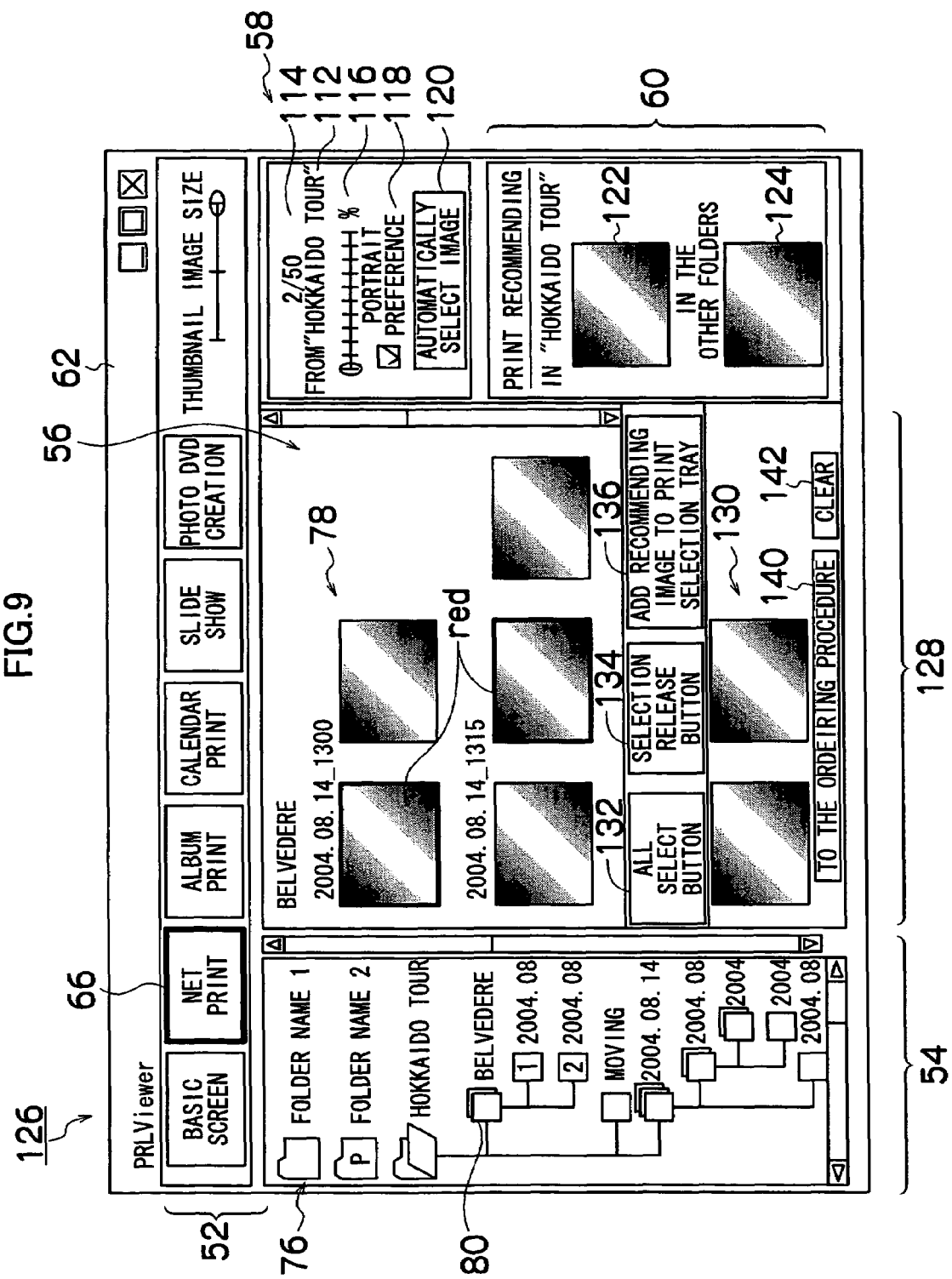
FIG. 9 is a diagram showing a net print screen.

Next, the net print screen will be described with reference to FIGS. 9 and 10. FIG. 9 is a diagram showing a net print screen. The net print screen 126 shown in FIG. 9, a print selection tray 128 is displayed below the thumbnail display field 56. In the description below, the same components as that of the basic screen 50 in FIG. 2 are provided with the same reference numerals as those in FIG. 2 and description thereof is omitted.

In the print selection tray 128 shown in FIG. 9, print candidate images 130 automatically or manually selected in the basic screen 50 (i.e., framed in red or blue in the thumbnail display field 56) are listed (displayed as thumbnails). In the net print screen 126, a user can change selection states of the thumbnail images 78 by using the thumbnail display field 56 as in the abovementioned basic screen 50. As a selection state of the thumbnail image 78 is changed, a print candidate image 130 in the print selection tray 128 is updated. In the net print screen 126, a user can select the print candidate image 130 also by dragging the thumbnail image 78 in the thumbnail display field 56 or the print recommended images 122 and 124 in the print recommending field 60 to the print selection tray 128.

As shown in FIG. 9, in the net print screen 126, the number of the print candidate images 130 in the print selection tray 128 is displayed in the number of images designating field 114. In the category icon 80 of the folder category field 54, the number of the print candidate images 130 that selected in each category is displayed.

At the top of the print selection tray 128, an all select button 132, a selection release button 134, an add recommended image to the print selection tray button 136 are arranged. The all select button 132 is a button for a user to select all the images in the currently selected folder. When the all select button 132 is clicked, all the thumbnail images 78 in the selected folder are framed in red in the thumbnail display field 56 and all the images are displayed in the print selection tray 128. The selection release button 134 is a button for a user to return the state of the thumbnail image 78 selected in the thumbnail display field 56 to the unselected state. The add recommended image to the print selection tray button 136 is a button for a user to move the print recommended images 122 and 124 displayed in the print recommending field 60 to the print selection tray 128. When the print recommended images 122 and 124 are moved to the print selection tray 128 by the abovementioned drag operation or by using the button 136, the print recommending field 60 is updated and the print recommended image (122 or 124) is exchanged with another image (for example, an image in the next good state).

Figure 10A:
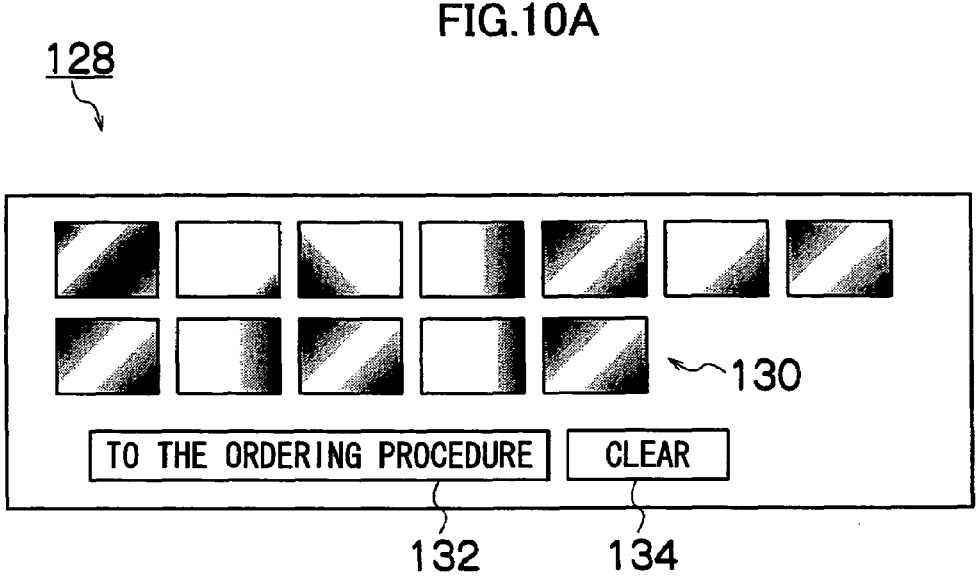
FIGS. 10A and 10B are diagrams showing the print selection tray 128.
Figure 10B:
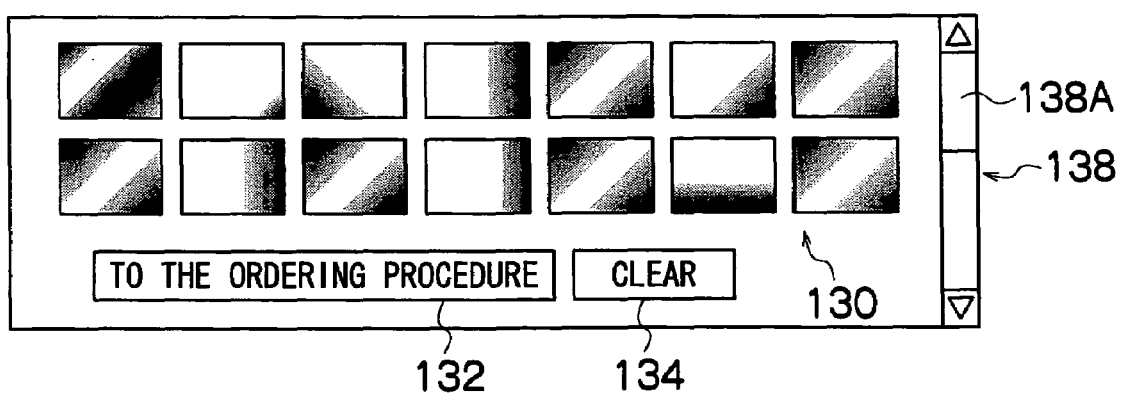

In the print selection tray 128, when the number of the print candidate image 130 increases, the print candidate image 130 is reduced in size so as to be contained in the print selection tray 128 as shown in FIG. 10A. The print candidate image 130 is impossible to be reduced in size under a predetermined size. Here, a predetermined size means a minimum size which a user can visually recognize when the image is displayed in the monitor 28 of the image processing apparatus 10. The predetermined size is determined based on the size, the resolution or the number of colors that can be displayed on the monitor 28. When the images cannot be contained in the print selection tray 128 even in the predetermined size, a scroll bar 138 is displayed as shown in FIG. 10B. A user can view all the print candidate images 130 in the print selection tray 128 by dragging and sliding the scroll bar slider 138A of the scroll bar 138 by using the mouse 32. Although when the images cannot be contained in the print selection tray 128 even in the predetermined size, the scroll bar 138 is displayed in the example of FIGS. 10A and 10B, the print candidate images 130 can be displayed in order by operational members such as a page turning button or the like. Adjustment of a thumbnail size as shown in FIGS. 10A and 10B can be also applied to another field (for example, folder category field 54, thumbnail display field 56, print recommending field 60 or the like).

In FIG. 9, when a user clicks on a "to the ordering procedure button 140", the image processing apparatus 10 is connected with a print order acceptance server (not shown) that accepts a print order via a network 38 for enabling the user to transfer the screen to the print order screen and place a print order. When a user clicks on the clear button 142, all the print candidate images 130 in the print selection tray 128 are deleted and frames given to the thumbnail imaged 78 (red frame or blue frame) are deleted in the thumbnail display field 56 and the images enter in the unselected state.

According to the embodiment, the thumbnail display field 56 and the print recommending field 60 for a user to select a print candidate image and the print selection tray 128 can be displayed side by side. Accordingly, a user can easily reference the print candidate images and the other images. As the size of the thumbnail can be reduced to a predetermined size which can be visually recognized by a user according to the number of the print candidate images in the print selection tray 128 and displayed, a user can view the print candidate images in the print selection tray 128 by scrolling the screen as less as possible.

Next, a print order screen will be described with reference to FIG. 11. FIG. 11 is a diagram showing a print order screen. The print order screen 144 shown in FIG. 11 has a print order number designating field 146 as well as the menu field 52 and the title bar 62. In the print order number designating field 146, the print candidate images 130 selected in the above mentioned FIG. 9 are displayed. A print order number inputting field 148 is placed under each of the print candidate images 130. When the screen is transferred to the print order screen 144, the image processing apparatus 10 analyses each of the print candidate images 130 and detects a face 150 of the imaged person. In an initial state of the print order screen 144 to which a screen is transferred, the number of the detected faces is previously inputted in the print order number inputting field 148 of the print candidate image 130 in which a face 150 is detected. On the other hand, the number one is previously inputted in the print order number inputting field 148 of the print candidate image 130 in which a face 150 is not detected. A user can change the number of the print order number inputting field 148 from the keyboard 30. A user can set the number of the print order of all the print candidate images 130 by clicking on "a print one for each of all images button 152".

When a user clicks on an order button 154, image data of the print candidate image 130, print order number, payment information for paying for the print are sent to the print order acceptance server and the print order is determined. When a return button 156 is clicked, the screen returns to the net print screen 126.

Figure 12:
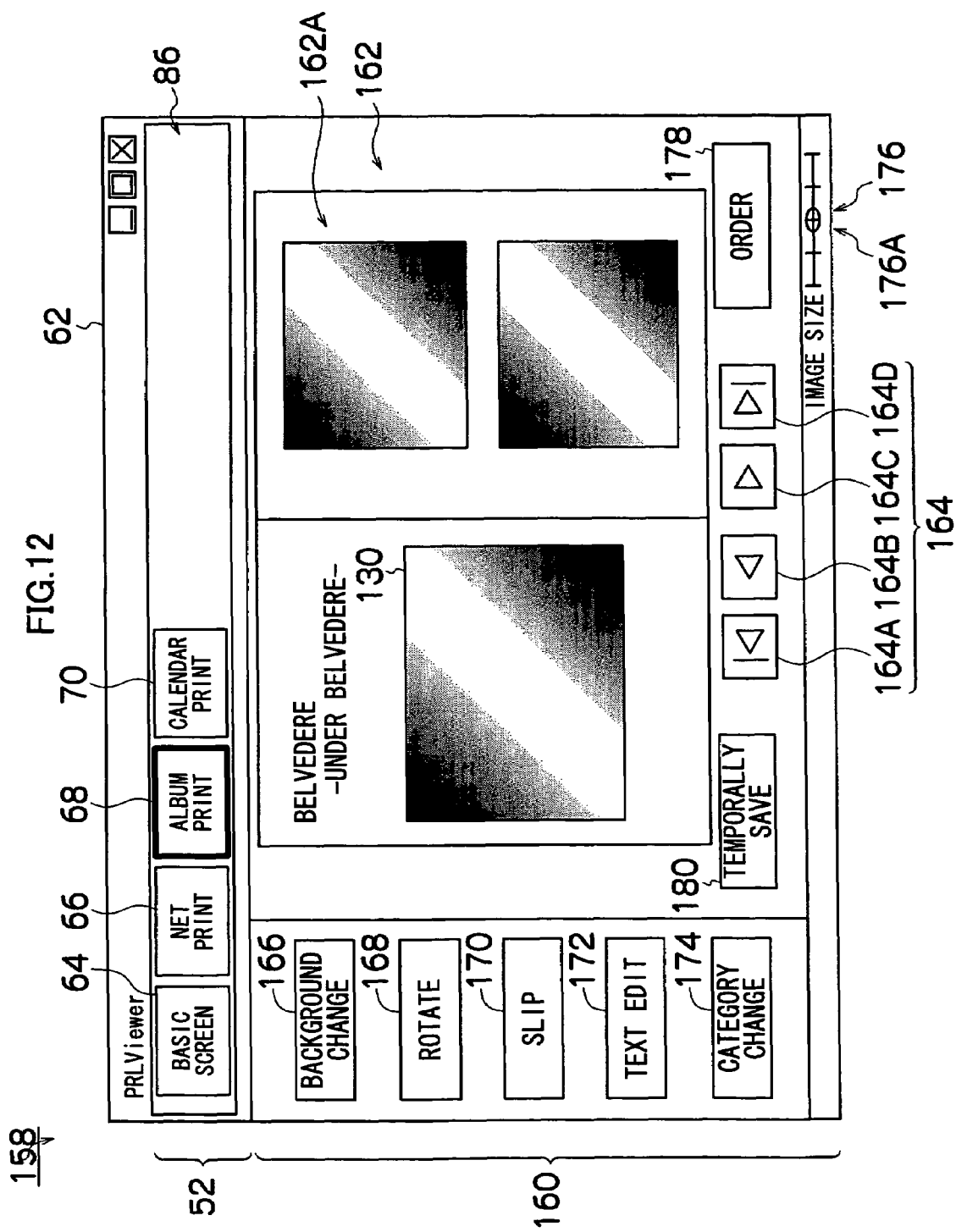
FIG. 12 is a diagram showing an album print screen.

Next, an album print screen will be described with reference to FIG. 12. FIG. 12 is a diagram showing an album print screen. The album print screen 158 shown in FIG. 12 has an album editing field 160 as well as a menu field 52 and a title bar 62. In the menu field 52, an album print button 68 is highlighted.

In the album editing field 160 shown in FIG. 12, album images 162 are displayed. Below the album images 162, a frame step button 164 for executing frame stepping of the album images 162 are placed. The frame step button 164 includes a top page button 164 which displays the top page of the album images 162, a one-page return button 164B which displays a prior page, a one-page advance button 164C which displays the next page, and a final page button 164D which displays the final page.

In the album image 162, print candidate images 130 selected in the abovementioned basic screen 50 and category names are automatically laid out. A user can select a color, a pattern or a quality of paper of the background (mounting) 162A of the album image 162. A user can also rotate the print candidate image 130 by a desired angle by using a rotating button 168. A user can clip (trimming) a desired part of the print candidate image 130 by selecting the desired part of the print candidate image 130 (for example, a rectangular area or a plurality of dots containing a desired part) by using the mouse 32 and clicking on a clip button 170 with the mouse 32. A user can add or edit a text area for a user to input a text or a category name by using a text edit button 172. A user can display the album images 162 that are created from the other category images by using the category change button 174. A user can change the individual size of the print candidate images 130 by selecting a desired print candidate image 130 with the mouse 32 and sliding a slider 176A of an image size switch 176.

When a user clicks on the order button 178, the album image 162 edited in the abovementioned way is sent to the print order acceptance server, where the order of the album print is determined. On the other hand, when a temporally saving button 180 is clicked, the album image 162 is temporally saved and the screen returns to the basic screen 50. Accordingly, a user can order album prints in bloc after editing the album images 162 for another category or another folder.

Next, a calendar print screen will be described with reference to FIG. 13. FIG. 13 is a diagram showing a calendar print screen. A calendar print screen 182 shown in FIG. 12 has an image selecting field 184 as well as a menu field 52 and a title bar 62. In the menu field 52, a calendar print button 70 is highlighted.

In the image selecting field 184, images used in the calendar from January to December (calendar images) are displayed. The image processing apparatus 10 automatically selects the calendar images 186 from images in the selected folder based on states of images such as focus, brightness, contrast, sharpness, camera shake or the like or date and time of imaging. Below each of the calendar images 186, an image changing button 188 is placed. A user can change the calendar images 186 by referencing the other images in the selected folder or the other folders by clicking the image change button 188.

A user can adjust the display size of the calendar image 186 by sliding a slider 190A of an image size switch 190 with the mouse 32.

When the user clicks on an order button 192, the calendar images 186 selected in the abovementioned way are sent to the print order acceptance server (not shown), where the order of the calendar print is determined. On the other hand, when a temporally save button 194 is clicked, information on the selected calendar images 186 is temporally saved and the screen returns to the basic screen 50. Accordingly, the user can order the images in block after editing the print candidate images 130 or the album images 162. When a cancel button 196 is clicked, information on the selected calendar images 186 is not saved and the screen returns to the basic screen 50.

Although the print candidate images to be ordered for printing are selected in the embodiment, the image processing apparatus 10 of the present invention can also be applied to select the image to be used in a predetermined application purpose other than the print order. Here, the application purpose for using images includes recording images on a predetermined recording medium (storing in memory card or CD-ROM, CD-R/RW, DVD-ROM, DVD-R/RW or the like), copying or moving images to a predetermined folder or a predetermined category, or creating contents by using the images (for example, a wall paper or a screen saver for a monitor of a personal computer (PC) or the like, a stand-by image of a PDA or a cellular phone, FLASH (registered trademark), web contents, electronic album or calendar).

Although an example where the image processing apparatus 10 of the present invention is applied is described in the embodiment, the present invention may be applied to a store front self terminal or the like which is set at the store front of a mini-lab shop or a DPE shop for a user to print images by himself/herself.

The image processing apparatus of the present invention can be realized when software programs or firmware programs including programs which execute the abovementioned processing are applied to a device with an image playing function such as a video playing device (a video cassette recorder, a television), or a digital camera, a printer, a personal digital assistance (PDA), a mobile photo player, a cellular phone or the like as well as a personal computer (PC).

What is claimed is:

1. An image processing apparatus comprising:
an image inputting device which inputs an image;
an image displaying device which displays the inputted image;
a quantity setting device which receives an input of a quantity of images to be used for a predetermined application purpose or an input of a ratio of a quantity of images to be used for the predetermined application purpose against a quantity of the all images inputted and sets the quantity of images to be used;
a first image selecting device which automatically selects a first image to be used according to a predetermined condition based on the set quantity of image to be used; and
an image attribute setting device which sets an image attribute of the inputted initial image to an unselected state and sets an image attribute of the first image to be used to the first selection state;
a second image selecting device which selects a second image to be used based on a designation inputted from a user; and
a quantity change device which changes a quantity of the first image to be used so that the sum of quantities of the first and second images to be used is the set quantity or less,
wherein the image attribute setting device sets the image attribute of the second image to be used to a second selection state.

2. The image processing apparatus according to claim 1, wherein the predetermined application purpose is at least one of printing or ordering to print the image to be used, recording the image to be used into a predetermined recording medium, copying or moving the image to be used to a predetermined folder, or creating contents using the image to be used.

3. The image processing apparatus according to claim 1, wherein the first image selecting device selects a first image to be used based on at least a condition of prioritizing a portrait image for preferentially selecting an image in which a person is detected, prioritizing a landscape image for preferentially selecting an image in which no person is detected or an image in which a person occupies a little ratio in the image, prioritizing a latest image for preferentially selecting an image whose taken or saved date and time is new, and prioritizing an old image for preferentially selecting an image whose taken or saved date and time is old.

4. The image processing apparatus according to claim 3, further comprising:
an operation device which adds predetermined operation to the first or second image to be used;
wherein the image attribute setting device sets an image attribute of the first or second image to be used to which the predetermined operation is applied to a non-selected state which is not selected by the first image selection device.

5. The image processing apparatus according to claim 4, wherein the image attribute setting device sets the image attribute of the image in the non-selected state to which the predetermined operation is applied to an unselected state.

6. The image processing apparatus according to claim 5, further comprising a display control device which displays the image distinguishable according to the image attribute.

7. The image processing apparatus according to claim 6, wherein the display control device varies at least one of a frame color, a shape, shading, an underline, a checkbox added to the image or an icon added to the image according to the image attribute.

8. The image processing apparatus according to claim 2, wherein the first image selecting device selects a first image to be used based on at least a condition of prioritizing a portrait image for preferentially selecting an image in which a person is detected, prioritizing a landscape image for preferentially selecting an image in which no person is detected or an image in which a person occupies a little ratio in the image, prioritizing a latest image for preferentially selecting an image whose taken or saved date and time is new, and prioritizing an old image for preferentially selecting an image whose taken or saved date and time is old.

9. The image processing apparatus according to claim 1, further comprising:
an operation device which adds predetermined operation to the first or second image to be used;
wherein the image attribute setting device sets an image attribute of the first or second image to be used to which the predetermined operation is applied to a non-selected state which is not selected by the first image selection device.

10. The image processing apparatus according to claim 9, wherein the image attribute setting device sets the image attribute of the image in the non-selected state to which the predetermined operation is applied to an unselected state.

11. The image processing apparatus according to claim 10, further comprising a display control device which displays the image distinguishable according to the image attribute.

12. The image processing apparatus according to claim 1, further comprising a display control device which displays the image distinguishable according to the image attribute.

13. The image processing apparatus according to claim 11, wherein the display control device varies at least one of a frame color, a shape, shading, an underline, a checkbox added to the image or an icon added to the image according to the image attribute.

14. The image processing apparatus according to claim 12, wherein the display control device varies at least one of a frame color, a shape, shading, an underline, a checkbox added to the image or an icon added to the image according to the image attribute.

15. An image processing method comprising the steps of:
(a) inputting an image;
(b) displaying the inputted image;
(c) receiving an input of a quantity of images to be used for a predetermined application purpose or an input of a ratio of a quantity of images to be used for the predetermined application purpose against a quantity of the all images inputted and setting the quantity of images to be used;
(d) automatically selecting a first image to be used according to a predetermined condition based on the set quantity of image to be used; and
(e) setting an image attribute of the inputted initial image to an unselected state and setting an image attribute of the first image to be used to the first selection state
(f) selecting a second image to be used based on the designation inputted by a user;
(g) changing the quantity of the first image to be used so that the sum of the first and second images to be used is equal to or less than the quantity set at the step (c); and
(h) setting the image attribute of the second image to be used to the second selection state.

16. The image processing method according to claim 15, further comprising the step of displaying the image distinguishable according to the image attribute.

17. The image processing method according to claim 16, further comprising the step of displaying the image distinguishable according to the image attribute.

18. An image processing program stored on a computer readable medium, causing a computer to execute:
an image inputting function which inputs an image;
an image displaying function which displays the inputted image;
a quantity setting function which receives an input of a quantity of images to be used for a predetermined application purpose or an input of a ratio of a quantity of images to be used for the predetermined application purpose against a quantity of the all images inputted and sets the quantity of images to be used;
a first image selecting function which automatically selects a first image to be used according to a predetermined condition based on the set quantity of image to be used; and
a first image attribute setting function which sets an image attribute of the inputted initial image as an unselected state and sets an image attribute of the first image to be used to the first selection state;
a second image selecting function which selects the second image to be used based on the designation inputted by a user;
quantity change function which changes a quantity of the first image to be used so that the sum of quantities of the first and second images to be used is equal to or less than the quantity set; and
a second image attribute setting function which sets the image attribute of the second image to be used to a second selection state.

19. The image processing program according to claim 18, causing a computer to execute a displaying control function which displays the image distinguishable according to the image attribute.

20. The image processing program according to claim 18, causing a computer to execute a displaying control function which displays the image distinguishable according to the image attribute.

* * * * *